I. M. NELDNER.
CASTER.
APPLICATION FILED JUNE 1, 1920.
1,376,724.
Patented May 3, 1921.
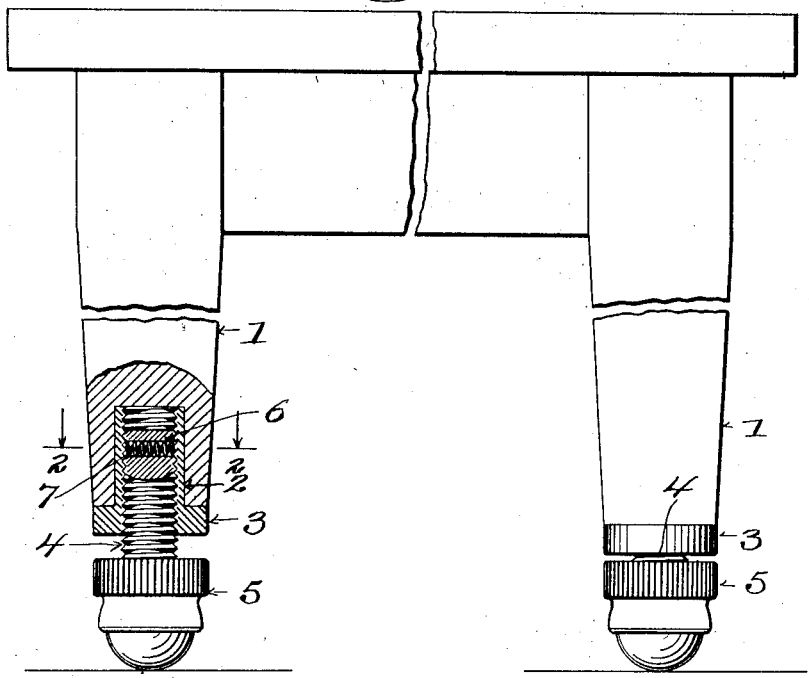
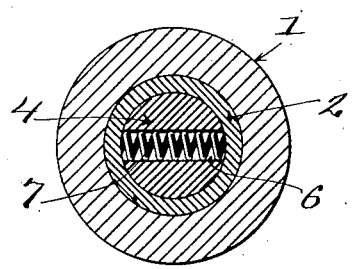
Witness:
Robert H. Weber
Inventor:
Theresa M. Neldner
By Young & Young,
Attorneys

UNITED STATES PATENT OFFICE.

THERESA M. NELDNER, OF MILWAUKEE, WISCONSIN.

CASTER.

1,376,724.  Specification of Letters Patent.  Patented May 3, 1921.

Application filed June 1, 1920. Serial No. 385,648.

*To all whom it may concern:*

Be it known that I, THERESA M. NELDNER, a citizen of the United States, and resident of Milwaukee, in the county of Milwaukee and State of Wisconsin, have invented certain new and useful Improvements in Casters; and I do hereby declare that the following is a full, clear, and exact description thereof.

My invention relates to furniture casters and has for its object to provide a simple economical means for vertically adjusting the caster to compensate for variations in the lengths of furniture legs, whereby such furniture can be micrometrically leveled.

With the above and other minor objects in view the invention consists in certain peculiarities of construction and combination of parts which will be hereinafter particularly described and claimed with reference to the accompanying drawings and subsequently claimed.

In the drawings:

Figure 1 represents a side elevation of a table the legs of which are provided with casters embodying the features of my invention, one of the legs being broken away and in section together with parts of the caster to more clearly illustrate the structural features of the invention, and Fig. 2 is an enlarged cross section of the leg and caster, the section being indicated by line 2—2 of Fig. 1.

Referring by character to the drawings, 1 represents the table leg apertured at its end for the reception of an internally threaded sleeve 2, the same being provided with a lower flange 3, which is adapted to snugly engage the bottom face of the leg. The threaded bore of the sleeve is threaded to receive a correspondingly threaded shank 4 of a caster head 5 of any desired type. That type shown in the drawing being of a single ball thread, but it should be understood that any ordinary wheel caster or other forms of anti-friction support can be utilized.

The upper end of the caster head shank is provided with a transversely disposed aperture 6 into which aperture is fitted a section of coil spring 7 that is slightly under compression, when confined within the sleeve bore, it being understood that the ends of the coil spring are adapted to engage the juxtaposed faces of the internal thread, which is formed in the sleeve.

From the foregoing description and drawings, it will be seen that if the legs or supports of a piece of furniture are of different relative heights, that the caster shanks can be adjusted so as to compensate for these differences in length whereby the furniture which is supported by the legs will be leveled up to a fine degree and after such adjustment of the caster. It is also apparent that the ends of the coil spring will impinge against the spring threads, as the shank 4 is screwed into place, the spring being adapted to rise and fall causing alternate compression and expansion thereof, as said ends rise over the sleeve threads until such time as the shank reaches its ultimate point of adjustment, whereby said spring ends will then formally grip the sleeve threads at undetermined high or low points to cause a positive friction engagement or lock. The tendency of the shank 4 to turn or change its adjusted position with relation to the sleeve, will thus be overcome or in other words the shank 4 is locked against adjustment, except when it is turned positively by the parties desiring a change of position of said shank. This adjustment of the caster heads can readily be fitted by any one without resorting to a skilled mechanic and when so adjusted the tension will hold the parts so adjusted firm.

While I have shown a caster applied to a table, obviously their use may be extended to all legs of furniture, where accurate adjustment is required, especially in billiard or other game tables, which must be micrometrically leveled. It is understood that various changes in the minor details of construction may be made without departing from the spirit of the invention as set forth in the claim.

I claim:

A caster comprising an internally threaded sleeve adapted to be fitted in an article of furniture or the like, a floor engaging or similar surface engaging caster head, a threaded shank extended from the head and threadedly engageable in said sleeve, said shank being transversely apertured, and a section of an expansile coil spring disposed in said aperture and having its severed ends extended beyond the ends of the latter before assembly of the shank in the sleeve, said ends of the coil spring being frictionally engaged in the threads of the sleeve when said shank is disposed therein whereby said spring will be alternately expanded and contracted during rotation of the shank, and the shank and the caster head will be locked against inadvertent turning with respect to the sleeve.

In testimony that I claim the foregoing I have hereunto set my hand at Milwaukee, in the county of Milwaukee and State of Wisconsin.

THERESA M. NELDNER.